United States Patent [19]

Takahira et al.

[11] Patent Number: 5,527,623
[45] Date of Patent: Jun. 18, 1996

[54] AQUEOUS EMULSION AND EASILY MACERATING MOISTURE-PROOF PAPER

[75] Inventors: Akitoshi Takahira, Kyoto; Yuuzi Yoshii, Chiba, both of Japan

[73] Assignee: Sumitomo Chemical Co., Ltd., Osaka, Japan

[21] Appl. No.: 515,044

[22] Filed: Aug. 14, 1995

Related U.S. Application Data

[62] Division of Ser. No. 44,059, Apr. 8, 1993, Pat. No. 5,466,735.

[30] Foreign Application Priority Data

Apr. 23, 1992 [JP] Japan .................. 4-104498

[51] Int. Cl.$^6$ ........................ B32B 9/06
[52] U.S. Cl. ................ 428/498; 428/510; 428/511; 428/514; 428/518
[58] Field of Search ................ 428/511, 518, 428/498, 510, 514

[56] References Cited

U.S. PATENT DOCUMENTS 4,714,727  12/1987  Hume ........................ 524/274
4,954,566   9/1990  Bull et al. .................. 524/378

FOREIGN PATENT DOCUMENTS 61-47896   8/1986   Japan.

*Primary Examiner*—Peter D. Mulcahy
*Attorney, Agent, or Firm*—Sughrue, Mion, Zinn, Macpeak & Seas

[57] ABSTRACT

An aqueous emulsion comprising a copolymer comprising ethylene, vinyl chloride, and vinyl acetate and having a glass transition temperature of from −15° to 35° C., an emulsion of a rosin ester having a softening point of from 110° to 150° C. and a Gardner color scale of not higher than 5, and an emulsion of a wax having a melting point of from 50° to 100° C., and an easily macerating water-proof paper obtained by coating the aqueous emulsion on at least one surface of a base paper. The paper coated with the aqueous emulsion has excellent moisture-proof property, water repellency, and easily macerating property, and does not cause blocking.

11 Claims, No Drawings

AQUEOUS EMULSION AND EASILY MACERATING MOISTURE-PROOF PAPER

This is a divisional of application Ser. No. 08/044,059, filed Apr. 8, 1993, now U.S. Pat. No. 5,466,735.

FIELD OF THE INVENTION

The present invention relates to an aqueous emulsion and an easily macerating moisture-proof paper prepared using the aqueous emulsion.

BACKGROUND OF THE INVENTION

Recently, from the standpoint of saving resources, a demand of collecting used papers and regenerating papers again after dissolving the papers in water, etc., has been increased. It is required for the papers meeting the demand to have a so-called easily macerating property, that is, when the paper is dissolved in water, etc., the paper is easily macerated into fine fibrous forms.

Now, a field of wrapping paper is an important use of a paper. It is usually required for the wrapping paper to have a water resistance such as a moisture-proof property, a water repellency, etc. However, the water resistance is a property incompatible with the easily macerating property and thus it was difficult to simultaneously obtain these two characteristics, that is, to practically obtain a paper having excellent moisture-proof property and water repellency and also excellent easily macerating property.

For example, a so-called laminate paper, i.e., a base paper laminated with polyethylene, etc., is known as a paper having excellent moisture-proof property and water repellency, but such a paper does not have an easily macerating property.

Under such a circumstance, JP-A-61-47896 (the term "JP-A" as used herein means an "unexamined published Japanese patent application") discloses an easily macerating moisture-proof paper obtained by coating a wax emulsion using a styrene-butadiene latex on a base paper. However, the paper obtained by this method is unsatisfactory in the point that blocking tends to occur due to a winding pressure at coating under a high-temperature and high-humidity atmosphere of the summer season.

SUMMARY OF THE INVENTION

Under such circumstances, the object of the present invention is to overcome the problems in the conventional techniques as described above and to provide an excellent easily macerating moisture-proof paper having not only excellent moisture-proof property and water repellency but also excellent easily macerating property, and which does not cause blocking.

As a result of various investigations to attain the above-described object, the inventors have succeeded in accomplishing the present invention.

That is, according to one embodiment of the present invention, there is provided an aqueous emulsion comprising the following components (A), (B), and (C) in a weight ratio (as a solid content basis) of (A)/(B)/(C)=100/(50 to 95)/(5 to 30);

Component (A): Ethylene-vinyl chloride series copolymer comprising from 3 to 40% by weight of ethylene, from 25 to 90% by weight of vinyl chloride, and from 0 to 73% by weight of vinyl acetate (total 100% by weight) and having a glass transition temperature of from $-15°$ C. to $35°$ C., Component (B): Emulsion of a rosin ester having a softening point of from $110°$ C. to $150°$ C. and a Gardner color scale of not higher than 5, Component (C): Emulsion of a wax having a melting point of from $50°$ C. to $110°$ C.

Also, according to another embodiment of the present invention, there is provided an easily macerating water-proof paper obtained by coating the aqueous emulsion on at least one surface of a base paper in an amount of from 5 to 30 g (solid content basis)/m$^2$.

DETAILED DESCRIPTION OF THE INVENTION

The present invention is described in detail below.

The aqueous emulsion of the present invention contains the components (A), (B), and (C) described above as the essential components.

The component (A) is an ethylene-vinyl chloride series copolymer comprising from 3 to 40% by weight of ethylene, from 25 to 90% by weight of vinyl chloride, and from 0 to 73% by weight of vinyl acetate (total 100% by weight), preferably comprising from 5 to 35% by weight of ethylene, from 30 to 75% by weight of vinyl chloride, and from 0 to 60% by weight of vinyl acetate (total 100% by weight), and having a glass transition temperature of from $-15°$ C. to $35°$ C., preferably from $-10°$ C. to $30°$ C. That is, the ethylene-vinyl chloride series copolymer in the present invention is an ethylene-vinyl chloride copolymer or an ethylene-vinyl chloride-vinyl acetate copolymer. Although the vinyl acetate is not an essential structural component, when it is used, the amount thereof used is generally at least about 0.1 by weight.

If the content of ethylene in the copolymer is too small, the easily macerating water-proof paper obtained by using such the aqueous emulsion has poor moisture-proof property and the macerating property, while if the content of ethylene is too large, the paper obtained has poor moisture-proof property, water repellency, and antiblocking property.

Further, if the content of the vinyl chloride in the copolymer is too small, the easily macerating water-proof paper obtained by using such the aqueous emulsion has poor moisture-proof property, water repellency, and antiblocking property, while if the content thereof is too large, the paper obtained has poor moisture-proof property, water repellency, and macerating property.

Furthermore, if the content of vinyl acetate in the copolymer is too large, the easily macerating water-proof paper obtained by using such the aqueous emulsion has poor moisture-proof property, water repellency, antiblocking property, and macerating property.

Also, the glass transition point of the copolymer is too low, the easily macerating moisture-proof paper obtained by using the emulsion has poor moisture-proof property, water repellency, and antiblocking property, while if the glass transition point is too high, the paper obtained has poor moisture-proof property and macerating property.

A production method of the copolymer satisfying the above-described requirements is, for example, the following method.

At least one kind of N-alkylols of an unsaturated aliphatic amide and unsaturated aliphatic carboxylic acids; at least one kind of an anionic surface active agent such as a sodium alkylbenzenesulfonate, an alkyl sulfosuccinate, etc., and a nonionic surface active agent such as a polyoxyethylene alkylphenol ether, a polyoxyethylene alkyl ether, etc.; a reducing agent such as acidic sodium sulfite, ferrous chloride, etc.; and the like are charged in a high-pressure reactor together with ion-exchanged water followed by mixing with stirring. After replacing air in the reactor with nitrogen, ethylene, vinyl chloride, and vinyl acetate are successively supplied therein under a pressure of from 5 to 150 atms and an aqueous solution of an initiator such as potassium persulfate, etc., is then added to the mixture. The ratio of ethylene, vinyl chloride, and vinyl acetate is controlled by controlling the supplying amounts thereof and the polymerization pressure. In addition, the polymerization temperature is usually from about 30° C. to 80° C. The above-described polymerization method is a radical polymerization method using a redox catalyst system comprising an initiator and a reducing agent, but a radical polymerization method using an initiator alone may be used.

The component (B) is an emulsion of a rosin ester having a softening point of from 110° C. to 150° C., preferably from 120° C. to 130° C., and a Gardner color scale of not higher than 5, preferably not higher than 3. If the softening point is too low, the paper obtained using the aqueous emulsion has poor moisture-proof property and antiblocking property, while if the softening point is too high, the paper obtained has poor moisture-proof property, water repellency, and macerating property. Also, if the Gardner color scale is too high, the coating layer of the aqueous emulsion is colored to reduce the appearance of the product.

Commercially available products satisfying the above-described conditions can be selectively used as the emulsion of the rosin ester used in the present invention.

The component (C) is the emulsion of a wax having a melting point of from 50° C. to 110° C., preferably from 50° C. to 70° C. If the melting point thereof is too low, the paper obtained using the aqueous emulsion has poor moisture-proof property and antiblocking property, while if the melting point thereof is too high, the paper obtained has poor moisture-proof property and macerating property.

The emulsion of wax which can be used in the present invention is, for example, commercially available paraffin wax emulsion or microwax emulsion, and if desired and necessary, a mixture of these emulsions can be used.

The aqueous emulsion of the present invention is an aqueous emulsion containing the components (A), (B), and (C) described above in the weight ratio (solid content basis) of (A)/(B)/(C)=100/(50 to 95)/(5 to 30), preferably 100/(70 to 80)/(10 to 20). If the components are not satisfied with the above-described ratio, the characteristics of the easily macerating moisture-proof paper obtained using the aqueous emulsion, such as the moisture-proof property, the antiblocking property, the water repellency, the macerating property, etc., are inconveniently unbalanced.

The aqueous emulsion of the present invention can be produced by, for example, the following method.

The copolymer as the component (A) is placed in a vessel equipped with a stirrer and stirred to an extent of not forming bubbles. The emulsion of the rosin ester as the component (B) and the emulsion of wax as the component (C) are successively added to the copolymer followed by stirring for mixing. The aqueous emulsion of the present invention can be thus obtained.

In addition, the solid content in the aqueous emulsion of the present invention is usually from 10 to 70% by weight, preferably from 30 to 65% by weight.

The easily macerating moisture-proof paper of the present invention is obtained by coating the aqueous emulsion on at least one surface of a base paper at an amount of from 5 to 30 g/m$^2$. If the amount of the aqueous emulsion used is too small, the paper obtained has poor moisture-proof property and water repellency by the formation of pinholes and the occurrence of fluffing of the fibers of the base paper, while if the amount of the aqueous emulsion is too large, the cost of the paper is disadvantageously increased.

A kraft paper, a wood free paper, a corrugated board base paper, etc., can be used as the base paper, but the base paper used in the present invention is not limited to those.

For obtaining the easily macerating moisture-proof paper of the present invention, for example, the definite amount of the aqueous emulsion is coated on a base paper and dried at a temperature of higher than about 120° C. In addition, when the drying temperature is too low, it sometimes happens that the easily macerating moisture-proof paper obtained is inferior in the moisture-proof property.

The easily macerating moisture-proof paper of the present invention is most suitably used in a wide field, for example, as a news paper winding wrapping paper, a water-resistant corrugated fiberboard paper, a wrapping paper for copying papers, etc., owing to the excellent characteristics.

The present invention is explained in more detail by reference to the following examples.

EXAMPLES 1 TO 8 AND COMPARATIVE EXAMPLES 1 TO 12

Aqueous emulsions were obtained under the conditions shown in Tables 1 to 3 and for each of the aqueous emulsions, the items of the moisture permeability, the water repellency, the antiblocking property, and the macerating property were evaluated as follows.

Coating Condition: Each coated paper having a basis weight of about 95 g/m$^2$ was obtained by coating each aqueous emulsion on a kraft paper having a basis weight of 80 g/m$^2$ with a wire rod of #18 at a coating amount of 20 g/m$^2$.

Moisture Permeability: Measured by a cup method according to JIS Z-0208.

Water Repellency: Measured according to JIS P- 8137.

Antiblocking Property: The coated surface of the coated paper was adhered to the coated surface or uncoated surface of other paper coated with the same kind of the aqueous emulsion as the above coated paper. The assembly was allowed to stand at a temperature of 45° C., at a relative humidity of 90%, and under a pressure of 5 kg/cm$^2$ for 24 hours. The coated papers were separated from each other by the hands, and the antiblocking property was evaluated by stages of from A (the best one: no resistance for the separation) to E (the worst one: paper break).

Macerating Property: 20 g of each paper sample coated with each emulsion was placed in 1000 ml of water. The mixture was stirred with a home mixer and the time until the sample was decomposed into single fibrous forms was measured.

The results obtained are shown in the following tables.

TABLE 1

| | Example | | | | | | |
|---|---|---|---|---|---|---|---|
| | 1 | 2 | 3 | 4 | 5 | 6 | 7 |
| Composition | | | | | | | |
| Component (A) | | | | | | | |
| Ethylene (wt %) | 23 | 14 | 6 | 30 | 21 | 20 | 20 |
| Vinyl Chloride (wt %) | 30 | 43 | 33 | 70 | 55 | 41 | 41 |
| Vinyl Acetate (wt %) | 47 | 43 | 61 | 0 | 24 | 39 | 39 |
| Glass Transition Temperature (°C.) | −9 | 10 | 15 | 0 | 0 | 0 | 0 |
| Component (B) | | | | | | | |
| Softening Point (°C.) | 125 | 125 | 125 | 125 | 125 | 150 | 110 |
| Gardner Color Scale | 3 | 3 | 3 | 3 | 3 | 3 | 3 |
| Component (C) | | | | | | | |
| Melting Point (°C.) | 57 | 57 | 57 | 57 | 57 | 57 | 57 |
| (A)/(B)/(C) Weight Ratio (as solid content) | | | | | | | |
| (A) | 100 | 100 | 100 | 100 | 100 | 100 | 100 |
| (B) | 80 | 80 | 80 | 80 | 80 | 80 | 95 |
| (C) | 20 | 20 | 20 | 20 | 20 | 20 | 5 |
| Evaluation | | | | | | | |
| Moisture Permeability (g/m²-24 hr.) | 13 | 18 | 10 | 24 | 18 | 18 | 16 |
| Water Repellency | R10 | R10 | R10 | R9 | R10 | R10 | R9 |
| Antiblocking Property | | | | | | | |
| Coated/Coated | A | A | A | B | A | A | B |
| Coated/Uncoated | A | A | A | B | A | A | A |
| Macerating Property (min.) | 9 | 10 | 8 | 7 | 7 | 7 | 7 |

TABLE 2

| | Example | Comparative Example | | | | |
|---|---|---|---|---|---|---|
| | 8 | 1 | 2 | 3 | 4 | 5 |
| Composition | | | | | | |
| Component (A) | | | | | | |
| Ethylene (wt %) | 20 | 2 | 16 | 3 | 10 | 20 |
| Vinyl Chloride (wt %) | 41 | 55 | 19 | 94 | 15 | 41 |
| Vinyl Acetate (wt %) | 39 | 43 | 65 | 3 | 75 | 39 |
| Glass Transition Temperature (°C.) | 0 | 38 | −5 | 70 | 10 | 0 |
| Component (B) | | | | | | |
| Softening Point (°C.) | 125 | 125 | 125 | 125 | 125 | 160 |
| Gardner Color Scale | 3 | 3 | 3 | 3 | 3 | 3 |
| Component (C) | | | | | | |
| Melting Point (°C.) | 57 | 57 | 57 | 57 | 57 | 57 |
| (A)/(B)/(C) Weight Ratio (solid content) | | | | | | |
| (A) | | 100 | 100 | 100 | 100 | 100 | 100 |
| (B) | | 50 | 80 | 80 | 80 | 80 | 80 |
| (C) | 30 | 20 | 20 | 20 | 20 | 20 |
| Evaluation | | | | | | |
| Moisture Permeability (g/m²-24 hr.) | 19 | 75 | 74 | 74 | 55 | 83 |
| Water Repellency | R10 | R10 | R7 | R7 | R6 | R7 |
| Antiblocking Property | | | | | | |
| Coated/Coated | A | A | C | A | C | A |
| Coated/Uncoated | A | A | D | A | B | A |
| Macerating Property (min.) | 10 | 20 | 9 | 25 | 25 | 25 |

TABLE 3

| | Comparative Example | | | | | | |
|---|---|---|---|---|---|---|---|
| | 6 | 7 | 8 | 9 | 10 | 11 | 12 |
| Composition | | | | | | | |
| Component (A) | | | | | | | |
| Ethylene (wt %) | 20 | 20 | 20 | 20 | 20 | 20 | 20 |
| Vinyl Chloride (wt %) | 41 | 41 | 41 | 41 | 41 | 41 | 41 |
| Vinyl Acetate (wt %) | 39 | 39 | 39 | 39 | 39 | 39 | 39 |
| Glass Transition Temperature (°C.) | 0 | 0 | 0 | 0 | 0 | 0 | 0 |
| Component (B) | | | | | | | |
| Softening Point (°C.) | 80 | 125 | 125 | 125 | 125 | 125 | 125 |
| Gardner Color Scale | 3 | 3 | 3 | 3 | 3 | 3 | 3 |
| Component (C) | | | | | | | |
| Melting Point (°C.) | 57 | 30 | 120 | 57 | 57 | 57 | 57 |
| (A)/(B)/(C) Weight Ratio (solid content) | | | | | | | |
| (A) | 100 | 100 | 100 | 100 | 100 | 100 | 100 |
| (B) | 80 | 80 | 80 | 150 | 30 | 95 | 95 |
| (C) | 20 | 20 | 20 | 30 | 30 | 50 | 2 |
| Evaluation | | | | | | | |
| Moisture Permeability (g/m²-24 hr.) | 58 | 73 | 150 | 84 | 123 | 94 | 220 |
| Water Repellency | R9 | R9 | R9 | R7 | R9 | R10 | R3 |
| Antiblocking Property | | | | | | | |
| Coated/coated | D | D | A | C | D | C | E |
| Coated/Uncoated | E | E | A | C | D | E | D |
| Macerating Property (min.) | 10 | 8 | 21 | 19 | 17 | 15 | 16 |

In the above tables, (Coated/Coated) means (Coated Surface/Coated Surface) and (Coated/Uncoated) means (Coated Surface/Uncoated Surface).

As shown in the above tables, in all the examples of the present invention meeting the conditions according to the present invention, all the samples show satisfactory results in all the evaluation items.

On the other hand, the sample of Comparative Example 1, wherein the content of ethylene in the component (A) is too small and the glass transition temperature is high, is poor in the moisture permeability and the macerating property.

The sample of Comparative Example 2, wherein the content of vinyl chloride in the component (A) is too small, is poor in the moisture permeability, the water repellency, and the antiblocking property.

The sample of Comparative Example 3, wherein the content of vinyl chloride in the component (A) is too large and the glass transition temperature is high, is poor in the moisture permeability, the water repellency, and the macerating property.

The sample in Comparative Example 4, wherein the content of vinyl acetate in the component (A) is too large, is poor in the moisture permeability, the water repellency, the antiblocking property, and the macerating property.

The sample in Comparative Example 5, wherein the softening point of the component (B) is high, is poor in the moisture permeability, the water repellency, and the macerating property.

The sample in Comparative Example 6, wherein the softening point of the component (B) is low, is poor in the moisture permeability and the antiblocking property.

The sample in Comparative Example 7, wherein the melting point of the component (C) is low, is poor in the moisture permeability and the antiblocking property.

The sample in Comparative Example 8, wherein the melting point of the component (C) is high, is poor in the moisture permeability and the macerating property.

The sample in Comparative Example 9, wherein the amount of the component (B) is too large, is poor in the moisture permeability, the water repellency, the antiblocking property, and the macerating property.

The sample in Comparative Example 10, wherein the amount of the component (B) is too small, is poor in the moisture permeability, the antiblocking property, and the macerating property.

The sample in Comparative Example 11, wherein the amount of the component (C) is too large, is poor in the moisture permeability, the antiblocking property, and the macerating property.

The sample in Comparative Example 12, wherein the amount of the component (C) is too small, is poor in the moisture permeability, the water repellency, the antiblocking property, and the macerating property.

As described above, it can be seen that the present invention can provide an excellent easily macerating moisture-proof paper which has excellent moisture-proof property and water repellency, also has excellent macerating property, and does not cause blocking.

While the invention has been described in detail and with reference to specific embodiments thereof, it will be apparent to one skilled in the art that various changes and modifications can be made therein without departing from the spirit and scope thereof.

What is claimed is:

1. An easily macerating moisture-proof paper comprising a base paper having coated on at least one surface thereof a layer of an aqueous emulsion comprising components (A), (B) and (C), described below, at the weight ratio of (A)/(B)/(C)=100/(50 to 95)/(5 to 30), wherein maximum amounts of components (B) and (C) to be added to the composition are 95 parts by weight and 30 parts by weight, respectively, per 100 parts by weight of component (A);

component (A): an ethylene-vinyl chloride series copolymer comprising from 3 to 40% by weight ethylene, from 25 to 90% by weight vinyl chloride, and from 0 to 73% by weight vinyl acetate and having a glass transition temperature of from −15° C. to 35° C.;

component (B): an emulsion of a rosin ester having a softening point of from 110° C. to 150° C.;

component (C): an emulsion of a wax having a melting point of from 50° C. to 110° C.;

wherein the layer of the aqueous emulsion is coated on the at least one surface of the base paper in an amount of from 5 to 30 g/m$^2$.

2. The paper as claimed in claim 1, wherein the ratio of ethylene, vinyl chloride, and vinyl acetate in component (A) of the aqueous emulsion is from 5 to 35% by weight ethylene, from 30 to 75% by weight vinyl chloride, and from 0 to 60% by weight vinyl acetate.

3. The paper as claimed in claim 1, wherein the vinyl acetate in component (A) of the aqueous emulsion is used in an amount of at least 0.1% by weight.

4. The paper as claimed in claim 1, wherein the glass transition temperature of component (A) in the aqueous emulsion is from −10° C. to 30° C.

5. The paper as claimed in claim 1, wherein the softening point of component (B) in the aqueous emulsion is from 120° C. to 130° C.

6. The paper as claimed in claim 1, wherein the Gardner color scale of component (B) in the aqueous emulsion is not higher than 5.

7. The paper as claimed in claim 6, wherein the Gardner color scale of component (B) in the aqueous emulsion is not higher than 3.

8. The paper as claimed in claim 1, wherein the melting point of component (C) in the aqueous emulsion is from 50° C. to 70° C.

9. The paper as claimed in claim 1, wherein the weight ratio of components (A), (B) and (C) in the aqueous emulsion is (A)/(B)/(C)= 100/(70 to 80)/(10 to 20).

10. The paper as claimed in claim 1, wherein the solid content in the aqueous emulsion is from 10 to 70% by weight.

11. The paper as claimed in claim 1, wherein the solid content in the aqueous emulsion is from 30 to 65% by weight.

* * * * *